(12) United States Patent
Girard et al.

(10) Patent No.: US 10,241,551 B2
(45) Date of Patent: Mar. 26, 2019

(54) CONTROL AND SYNCHRONIZATION MECHANISM FOR A COMPLEX DISTRIBUTED POWER MANAGEMENT SYSTEM

(71) Applicant: Dialog Semiconductor (UK) Limited, London (GB)

(72) Inventors: Olivier Girard, Munich (DE); Daniele Giorgetti, Munich (DE); Joao Paulo Trierveiler Martins, Graz (AT); Philip Todd, Corsham (GB)

(73) Assignee: Dialog Semiconductor (UK) Limited, London (GB)

( * ) Notice: Subject to any disclaimer, the term of this patent is extended or adjusted under 35 U.S.C. 154(b) by 105 days.

(21) Appl. No.: 15/284,608

(22) Filed: Oct. 4, 2016

(65) Prior Publication Data

US 2017/0153680 A1 Jun. 1, 2017

(30) Foreign Application Priority Data

Nov. 30, 2015 (DE) ........................ 10 2015 223 785

(51) Int. Cl.
*G06F 1/00* (2006.01)
*G06F 1/26* (2006.01)
(Continued)

(52) U.S. Cl.
CPC ................ *G06F 1/266* (2013.01); *G06F 1/26* (2013.01); *G06F 1/30* (2013.01); *G06F 1/3206* (2013.01); *G06F 13/362* (2013.01)

(58) Field of Classification Search
None
See application file for complete search history.

(56) References Cited

U.S. PATENT DOCUMENTS

2004/0172603 A1 9/2004 Collmeyer et al.
2006/0085654 A1* 4/2006 Nokkonen ............ G06F 1/3203
713/300
(Continued)

FOREIGN PATENT DOCUMENTS

WO WO2014195341 12/2014

OTHER PUBLICATIONS

German Office Action, File No. 10 2015 223 785.0, Applicant: Dialog Semiconductor (UK) Limited, dated Dec. 16, 2015, 4 pgs and Engilsh language translation, 4 pgs.

*Primary Examiner* — Nitin C Patel
(74) *Attorney, Agent, or Firm* — Saile Ackerman LLC; Stephen B. Ackerman

(57) ABSTRACT

A distributed power management system comprising at least two power management integrated circuits PMICs is presented. A master power management integrated circuit PMIC supplies power to a subsystem of an electronic device based on a current state of a master finite state machine FSM executed by the master PMIC. A slave power management integrated circuit PMIC executes a slave finite state machine FSM and supplies power to another subsystem based on the current state of the master FSM. For synchronizing the operation of both PMIC, the master PMIC transmits, to the slave PMIC, synchronization information indicative of at least one of an input signal of the master FSM, a state of the master FSM, a state transition of the master FSM, and an output signal generated by the master FSM. A distributed power management method is presented which is carried out by a master PMIC and a slave PMIC.

28 Claims, 7 Drawing Sheets

(51) Int. Cl.
*G06F 1/30* (2006.01)
*G06F 13/362* (2006.01)
*G06F 1/3206* (2019.01)

(56) References Cited

U.S. PATENT DOCUMENTS

| | | | |
|---|---|---|---|
| 2006/0288246 A1* | 12/2006 | Huynh | G06F 1/3203 |
| | | | 713/320 |
| 2012/0080945 A1 | 4/2012 | Vasadi et al. | |
| 2015/0220123 A1 | 8/2015 | Rosik et al. | |
| 2016/0124484 A1* | 5/2016 | Varkki | G06F 1/3228 |
| | | | 713/310 |

* cited by examiner

CONTROL AND SYNCHRONIZATION MECHANISM FOR A COMPLEX DISTRIBUTED POWER MANAGEMENT SYSTEM

TECHNICAL FIELD

This document relates to a system and method for power management. Specifically, the document relates to a power management system comprising power management integrated circuits PMICs for powering a plurality of subsystems of an electronic device.

BACKGROUND

A power management integrated circuit PMIC is a power supply device for supplying electrical power to different subsystems of an electronic device. In general, the PMIC controls the power flow from an energy source (such as e.g. a wall plug charger, a battery, or a supercapacitor) to the respective subsystems. At this, it is the task of a PMIC to meet the voltage and current requirements of the subsystems, or to reduce the overall power consumption of the electronic device. The PMIC may comprise e.g. voltage regulators or overcurrent detectors for protecting both the individual subsystem as well as the PMIC itself.

Examples for subsystems of an electronic device which may be powered by a PMIC include e.g. processing units such as microprocessors, digital signal processors DSP, application-specific integrated circuits ASICs, field programmable gate arrays FPGAs, storage units such as volatile or non-volatile memory units, input/output devices such as e.g. touchscreen displays, battery chargers, display subsystems e.g. for LCD display back lighting, LEDs, wireless radios, sensor units such as acceleration sensors or temperature sensors, or digital cameras.

The PMIC is fully autonomous. It is typically the first system device powered on and the last device powered off. Configuration data of the PMIC may be held in non-volatile memory. The PMIC may serve as power supply for all subsystems of an electronic device. For this purpose, PMICs may execute finite state machines for controlling the power states of the subsystems and typically include power state control circuitry for power-up and power-down sequencing and system status monitoring. Multiple active power states may exist. Based on external or internal triggers, the PMIC may control power sequencing and transitions between different power states.

The system monitoring function of a PMIC may include voltage, current and temperature monitoring. In addition, the system status monitoring may include post processing functionality like e.g. conversion and aggregation of analog-to-digital conversion ADC samples over a period of time. In other words, the PMIC may keep a history about recent values of the system status and power supply to a subsystem may be based on said history.

SUMMARY

The present disclosure provides a distributed power management system comprising a master power management integrated circuit PMIC and a slave power management integrated circuit PMIC. The master PMIC is configured to supply power to a subsystem of an electronic device based on a present (or current) state of a master finite state machine FSM executed by the master PMIC. To simplify the following description, the subsystem powered by the master PMIC is denoted as master subsystem. On the other hand, the slave PMIC is configured to execute a slave finite state machine FSM and to supply power to another subsystem of the electronic device based on the present (or current) state of the master FSM. The subsystem powered by the slave PMIC is denoted as slave subsystem. The master subsystem may be different from the slave subsystem. In particular, the devices belonging to the master subsystem and the devices belonging to the slave subsystem may form disjoint sets of devices. There may be a plurality of master subsystems i.e. subsystems to which power is supplied by the master PMIC. Similarly, there may be a plurality of slave subsystems i.e. subsystems to which power is supplied by the slave PMIC.

Although the slave FSM is running on the slave PMIC, the power supply to the slave subsystem is primarily based on the current state of the master FSM. This behavior of the slave PMIC is enabled by synchronizing the way the master PMIC and the slave PMIC supply power to the various subsystems. For synchronizing this operation of both PMICs, the master PMIC is configured to transmit, to the slave PMIC, synchronization information indicative of at least one of an input signal of the master FSM, a state of the master FSM, a state transition of the master FSM, and an output signal generated by the master FSM.

The electronic device may be e.g. a mobile phone, a smart phone, a personal digital assistant PDA, a tablet PC, a laptop PC, or any other kind of portable or non-portable electronic device. As already discussed in the introduction, the subsystems may have multiple internal voltages and may be in different power states. Electrical power is supplied by the respective PMIC to the subsystem e.g. by means of voltage conversion, power sequencing, dynamic voltage and/or frequency scaling, etc. In case the subsystem comprises a battery, the respective PMIC may also be configured to control the charging process of the battery.

In the described power management system, the two PMICs perform their function as if they were a single PMIC. Each PMIC has its own state control circuitry implementing the respective FSM and power sequencing, and the operation of both PMICs is synchronized. The synchronization may be achieved by directly transmitting synchronization information indicative of one or more output signals of the master FSM running on the master PMIC to the slave PMIC. In this scenario, the slave PMIC ignores/bypasses the slave FSM running at its local state control circuits and tracks/follows the output signals received from the master PMIC. In this scenario, the slave PMIC treats the received synchronization information as instructions from the master PMIC.

Alternatively, the slave PMIC may be configured to synchronize, based on the received synchronization information, execution of the slave FSM with the master FSM and to supply power to the slave subsystem based on a current state of the slave FSM. In other words, the slave PMIC may keep its own copy of the master FSM synchronized with the help of the received synchronization signal. Put in a different way, a state of the master FSM is mirrored on the slave FSM. To this end, the synchronization signal may comprise information indicative of e.g. an input signal, a state or state transition of the master FSM.

It should be noted that the master FSM and the slave FSM need not to be identical. It suffices that both FSMs comprise a set of joint states which are present at both the master FSM and the slave FSM. Moreover, not all states of the set of joint states need to be synchronized between the master FSM and the slave FSM. Rather, only a set of so-called anchor states may be synchronized, whereas the remaining states are executed independently without being synchronized. For instance, the FSMs may not be synchronized while in an initialization state, a start up state, a power down state or an error state. The other way round, FSMs may be synchronized in a power up state, switching e.g. between a first power state and a second power state.

Where the powered subsystems are physically located far apart, it may be desirable to split the PMIC function into multiple integrated circuits. The proposed distributed power management system makes it possible that two or more PMICs can be positioned in the vicinity of their respective subsystems. Thus, power supply track lengths as well as routing congestion may be reduced. In any case, the distributed power management system comprising the master PMIC and one or more slave PMICs appears as a single integrated PMIC to an external observer e.g. a host system.

Any of the master PMIC and the slave PMIC may be the first to power on. Each PMIC may be capable of initializing itself and initiating communication with the other PMIC. The initialization phases of the master PMIC and the slave PMIC may be independent of each other and may be controlled by the respective local FSM. The slave PMIC may be configured to transmit, to the master PMIC, an initialization complete message indicating that the slave PMIC has finished an initialization procedure. Moreover, the master PMIC may be configured to transmit, responsive to receiving the initialization complete message, a synchronization instruction message to the slave PMIC, instructing the slave PMIC to supply power to the slave subsystem based on the current state of the master FSM. After the slave PMIC has received the synchronization instruction message, the power supply to the slave subsystem and/or execution of the slave FSM may be controlled by the master FSM running at the master PMIC.

If the distributed power management system comprises two or more slave PMICs, the master PMIC may wait until all slave PMICs have transmitted an initialization complete message. Once an initialization complete message has been received from each slave PMIC, the master PMIC returns a synchronization instruction message to all slave PMICs.

The master PMIC may be configured to transmit the synchronization information responsive to a change of an input signal, the state or an output signal of the master FSM. The synchronization information may comprise all information regarding signals and states, regardless of whether the respective values have changed. Optionally, the synchronization information may only comprise the values of the changed signals and states. The master PMIC may broadcast the synchronization information to all slave PMICs simultaneously or transmit the synchronization information to each slave PMIC individually.

Alternatively or additionally, the distributed power management system may comprise a timer and the master PMIC may be configured to transmit a synchronization signal comprising synchronization information when the timer expires. The timer may be part of the master PMIC or external to the latter. Each time a synchronization information is transmitted, the timer may be reset. The timer may guarantee a maximum time interval between two consecutive synchronization signals and, thus, a tight synchronization between master and slave PMIC.

Furthermore, the slave PMIC may be configured to transmit, to the master PMIC, synchronization information indicative of a current state of the slave FSM or status information indicative of a status of the slave subsystem powered by the slave PMIC. The synchronization information transmitted by the slave PMIC makes it possible to resolve or reduce runtime conflicts occurring during power sequencing. For instance, power sequences executed by the individual PMICs may take different times to complete. In state tracking mode, i.e. after the synchronization instruction message has been transmitted from the master PMIC to the slave PMICs, the slave PMICs are able to signal to the master PMIC that they are busy because their power sequence has not completed. In other words, the synchronization information transmitted by the slave PMIC can be interpreted as a "wait" request to inform the master PMIC that the current state of the master FSM should not change. Such a request may be required if, for example during power sequencing, the duration of a power sequence in each device is different. In this case, it would be necessary for the master PMIC to remain in the current state at least until all of the slave PMICs have completed their own sequence.

On the other hand, transmitting status information concerning a status of the slave subsystem from the slave PMIC to the master PMIC makes it possible that the master PMIC may take into account the slave status information as input signal(s) for the master FSM. The status information may include e.g. voltages, currents and/or temperatures measured by respective sensors. After an analog-to-digital conversion has been performed by the slave PMIC or an analog-to-digital converter external to the slave PMIC, the measured values are transmitted as status information to the master PMIC. The other way round, the master PMIC may be configured to transmit, to the slave PMIC, status information concerning a status of the master subsystem. Further, the distributed power management system may comprise a second slave PMIC configured to supply power to a second slave subsystem, wherein the second slave PMIC or the master PMIC is configured to transmit, to the slave PMIC, status information concerning a status of the second slave subsystem. In this way, a mechanism is provided which keeps status information originating from the different subsystems tightly synchronized within the distributed power management system.

In summary, the proposed distributed power management system enables the sharing and synchronization of state information of the individual FSMs and status information regarding the status of the different subsystems. Respective information may be captured in a protocol message layer. Again, corresponding messages including state and status information may be created and transmitted upon detection of a change of the corresponding information. Alternatively or additionally, creation and transmission of messages may be time-triggered using dedicated timers.

The distributed power management system may further comprise a watchdog timer which is reset when synchronization information or status information is received by the master PMIC and the distributed power management system is configured to generate an error event upon expiry of the watchdog timer. The watchdog timer may be e.g. located at the master PMIC and implements a further control mechanism which may detect a sudden catastrophic loss of a slave PMIC. In a distributed system comprising more than one slave PMIC, the master PMIC may comprise several watchdog timers for the individual slave PMICs.

Additionally, each slave PMIC may also comprise a watchdog timer for generating an error event in case state information or status information is not transmitted by the master PMIC in due time. Moreover, all PMICs may be configured to safely shut-down in case an error event occurs. Each PMIC may continue to a power down state and sequence the power down of its connected subsystems. If all of the PMICs begin their power down sequence as soon as the error event is detected or transmitted, then system power sequence ordering and intervals may be preserved.

The master PMIC may be configured to receive, from a host device, a communication directed to a target slave PMIC, to determine an identity of the target slave PMIC based on the communication, and to forward the communication to the a target slave PMIC. Specifically, the master PMIC may be configured to translate an address or a message content into a target slave format. To this end, the master PMIC may comprise a memory map rerouting circuit which automatically and transparently redirects memory map accesses to the slave PMIC associated with a section of a memory map. Access to the full memory map by the host device could be supported by a single communication interface between the host device and the master PMIC.

The master PMIC may be configured to receive, from a host device, an analog-to-digital conversion ADC request comprising ADC channel information, to determine an identity of a destination slave PMIC based on the ADC channel information, and to forward the ADC request to the destination slave PMIC. Moreover, the master PMIC may be configured to receive, from a slave PMIC, ADC measurement data, to determine an ADC result by performing post-processing based on the received ADC measurement data, and to forward the ADC result to the host device. Particularly, the master PMIC may comprise an ADC control rerouting circuit which automatically and transparently redirects ADC requests on specific ADC channels to the destination slave PMIC associated with that ADC channel. Alternatively, when the ADC channel information indicates that the master PMIC is responsible for the ADC conversion, the master PMIC performs the ADC conversion himself and reports the ADC measurement data, with or without an optional post-processing, to the host device. Access to all ADC channels by the external host could be supported by a single communication interface between the host device and the master PMIC.

According to another aspect of the present disclosure, a distributed power management method is proposed. The method is carried out by a master PMIC and a slave PMIC and comprises the following method steps: executing, by the master PMIC, a master FSM; supplying, by the master PMIC, power to a master subsystem of an electronic device based on a current state of the master FSM; supplying, by a slave PMIC, power to a slave subsystem of the electronic device based on the current state of the master FSM; and transmitting, by the master PMIC, synchronization information indicative of at least one of an input signal of the master FSM, a state of the master FSM, a state transition of the master FSM, and an output signal generated by the master FSM to the slave PMIC.

Moreover, the slave PMIC may execute a slave FSM and synchronize the slave FSM with the master FSM based on the received synchronization information. In this situation, the slave FSM may supply power to the slave subsystem based on a current state of the slave FSM.

The distributed power management system may be implemented partly or completely using e.g. one of the following communication standards: the Inter-Integrated Circuit I²C communication standard, the Serial Peripheral Interface SPI standard, the System Management Bus SMBus standard, the Power Management Bus PMBus standard, or the System Power Management Interface SPMI specification.

It should be noted that the methods and apparatuses including its preferred embodiments as outlined in the present document may be used stand-alone or in combination with the other methods and apparatuses disclosed in this document. In addition, the features outlined in the context of an apparatus are also applicable to a corresponding method. Furthermore, all aspects of the methods and apparatuses outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein FIG. 1 schematically illustrates numerous subsystems of an electronic device powered by a single power management integrated circuit PMIC.

DESCRIPTION

Figure 1:
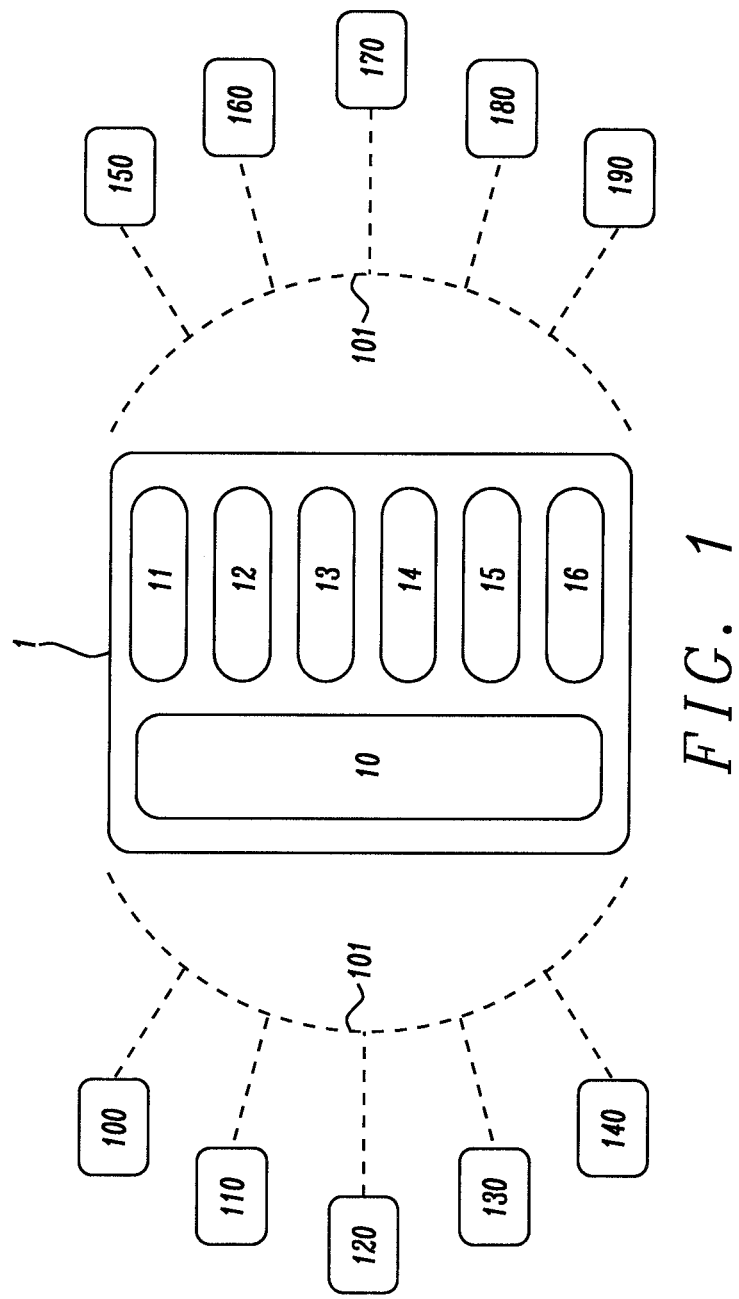

FIG. 1 schematically illustrates an exemplary power management integrated circuit PMIC 1 which is implemented on a single integrated circuit. PMIC 1 supplies power to numerous subsystems 100, 110, 120, 130, 140, 150, 160, 170, 180, 190 of an electronic device. The subsystems are coupled to the PMIC via power supply circuitry 101, which is indicated in FIG. 1 by dashed lines. FIG. 1 depicts several applications which may be implemented on a PMIC 1. The applications include a host interface 10, a finite state machine FSM 11, a power sequencer 12, a memory mapper 13, an analog-to-digital conversion ADC controller 14, an ADC sequencer 15, and an ADC post-processor 16. Further applications may concern system monitoring, general-purpose input/output GPIO and storage of data. All applications may be implemented in hardware, software or a combination of both. In particular, a finite state machine FSM 11 may be implemented in a digital circuit comprising e.g. a programmable logic device, a programmable logic controller, logic gates and flip flops or relays.

The PMIC 1 serves as a power supply device for supplying electrical power to the different subsystems of the electronic device. At this, the PMIC regulates the power flow from an energy source (such as e.g. a wall plug charger, a battery, or a supercapacitor) to the respective subsystems. Those skilled in the art will understand that the illustrated PMIC 1 is just an exemplary embodiment and that the disclosure is not limited to the mentioned applications. Rather, a PMIC 1 may comprise more or less applications than illustrated in FIG. 1.

Figure 2:
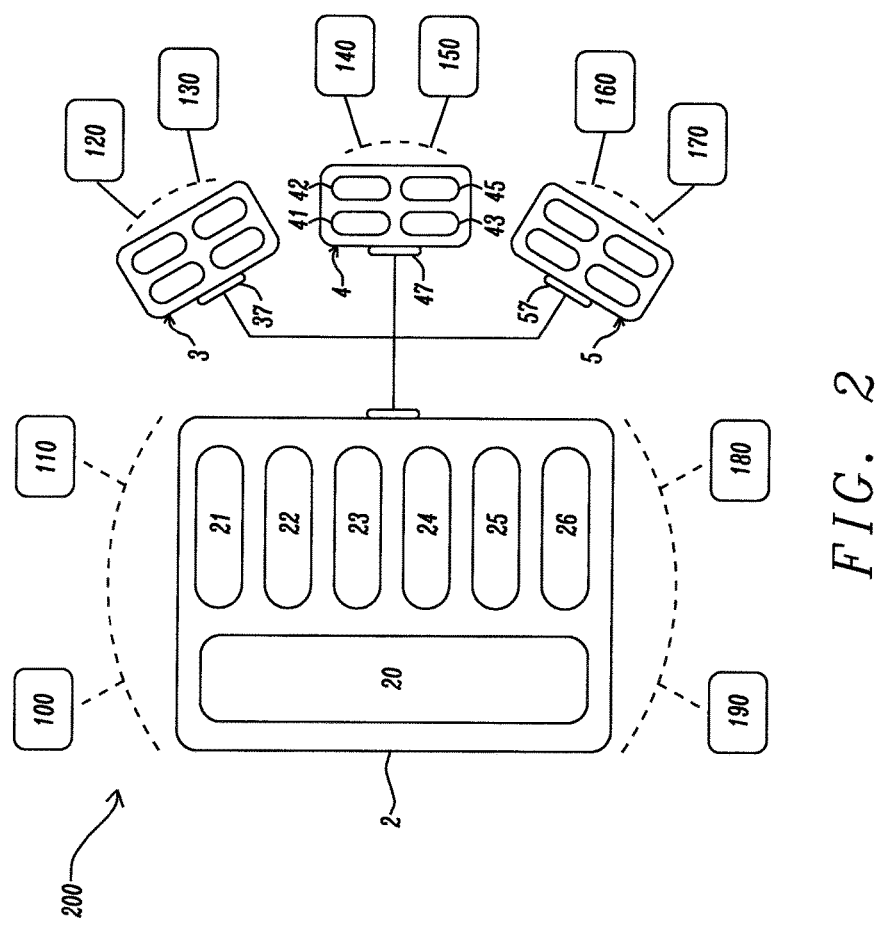
FIG. 2 schematically illustrates a distributed power management system.
Figure 3:
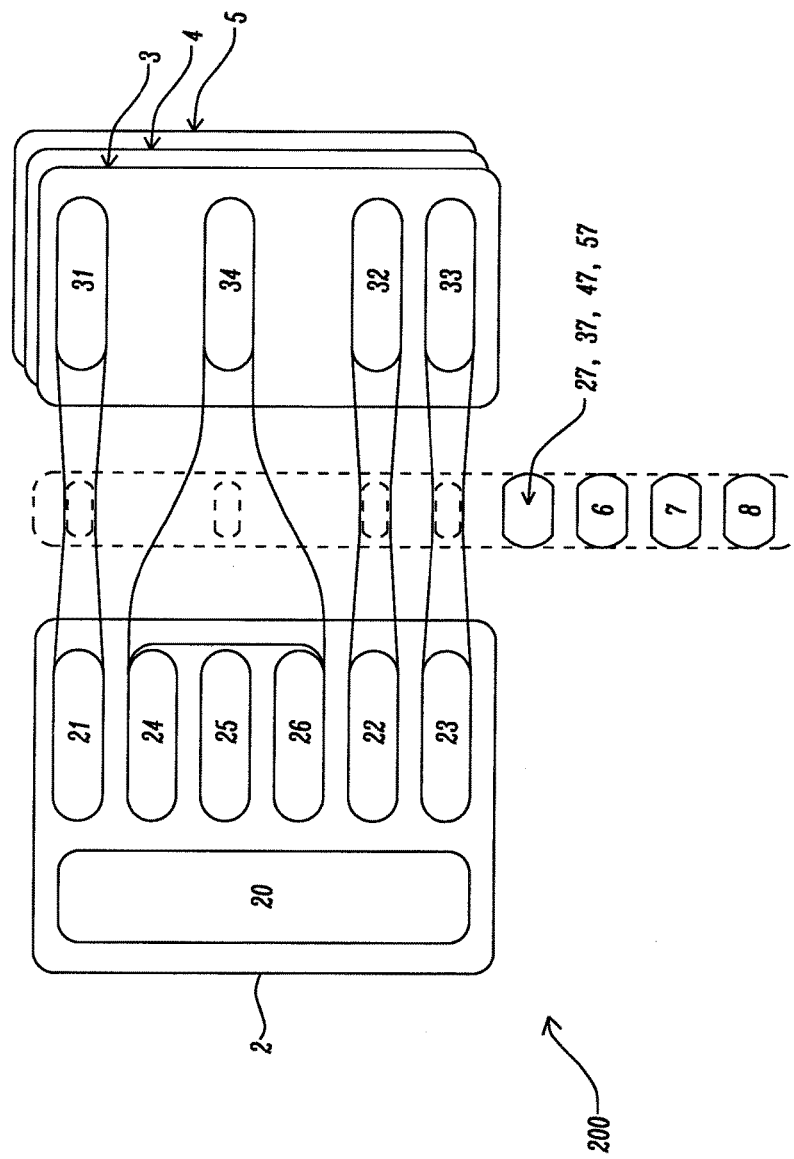
FIG. 3 schematically illustrates another view of a distributed power management system.

FIGS. 2 and 3 illustrate different schematic views on a distributed power management system 200 which serves as an example useful for understanding the present invention. However, the depicted example system is not meant to limit the scope of the disclosure or the claims.

In the distributed power management system 200, the functionality previously provided by the single PMIC 1 is provided by four PMICs 2, 3, 4, 5 which may be physically distributed at different positions within the electronic device. The exemplary distributed power management system 200 comprises a master PMIC 2 and three slave PMICs 3, 4, 5. The master PMIC 2 is responsible for the power management of four subsystems 100, 110, 180, 190, a first slave PMIC 3 supplies power to two subsystems 120, 130, a second slave PMIC 4 supplies power to two subsystems 140, 150 and a third slave PMIC 5 supplies power to two subsystems 160, 170. As illustrated in FIG. 2, the PMICs are connected via a set of communication links 9 and each PMIC comprises a communication interface 27, 37, 47, 57 for communicating with the other PMICs. The number of slave PMICs is arbitrarily chosen. In the simplest scenario, the system may only comprises a master PMIC 2 and a single slave PMIC 3. As illustrated in FIG. 2, communication links 9 are provided between all slave PMICs 3, 4, 5 and the master PMIC 2. Moreover, in an alternative system setup, communication links 9 may only be provided between each individual slave PMIC 3, 4, 5 and the master PMIC 2 and not between the slave PMICs 3, 4, 5.

The master PMIC 2 provides at least the same functionality as the PMIC 1 discussed in the context of FIG. 1. In particular, the applications implemented on the master PMIC 2 include a host interface 20, a finite state machine FSM 21, a power sequencer 22, a memory mapper 23, an analog-to-digital conversion ADC controller 24, an ADC sequencer 25, and an ADC post-processor 26. As can be seen in FIGS. 2 and 3, each slave PMIC 2, 3, 5 may only provide the reduced functionality of a slave FSM 31, 41, 51, a power sequencer 32, 42, 52, a memory mapper 33, 43, 53 and an ADC controller 34, 44, 54. The functionality of the ADC sequencer 25 and ADC post-processor may be solely implemented on master PMIC 2. A slave PMIC's FSM, power sequencer, memory mapper and ADC controller must be capable of acting independently at certain times but then also as part of the larger function of the distributed power management system 200 when required.

FIG. 3 shows a conceptual drawing of relevant parts of the distributed power management system 200, with a particular focus on some of the additional elements required in each PMIC. The additional elements include communication interfaces 27, 37, 47, 57, the implementation of a messaging mechanism 6, message timers 7 and watchdog timers 8. The latter elements enable a tight state and power sequence synchronization and error handling and will be described in more detail in the following paragraphs.

Figure 4:
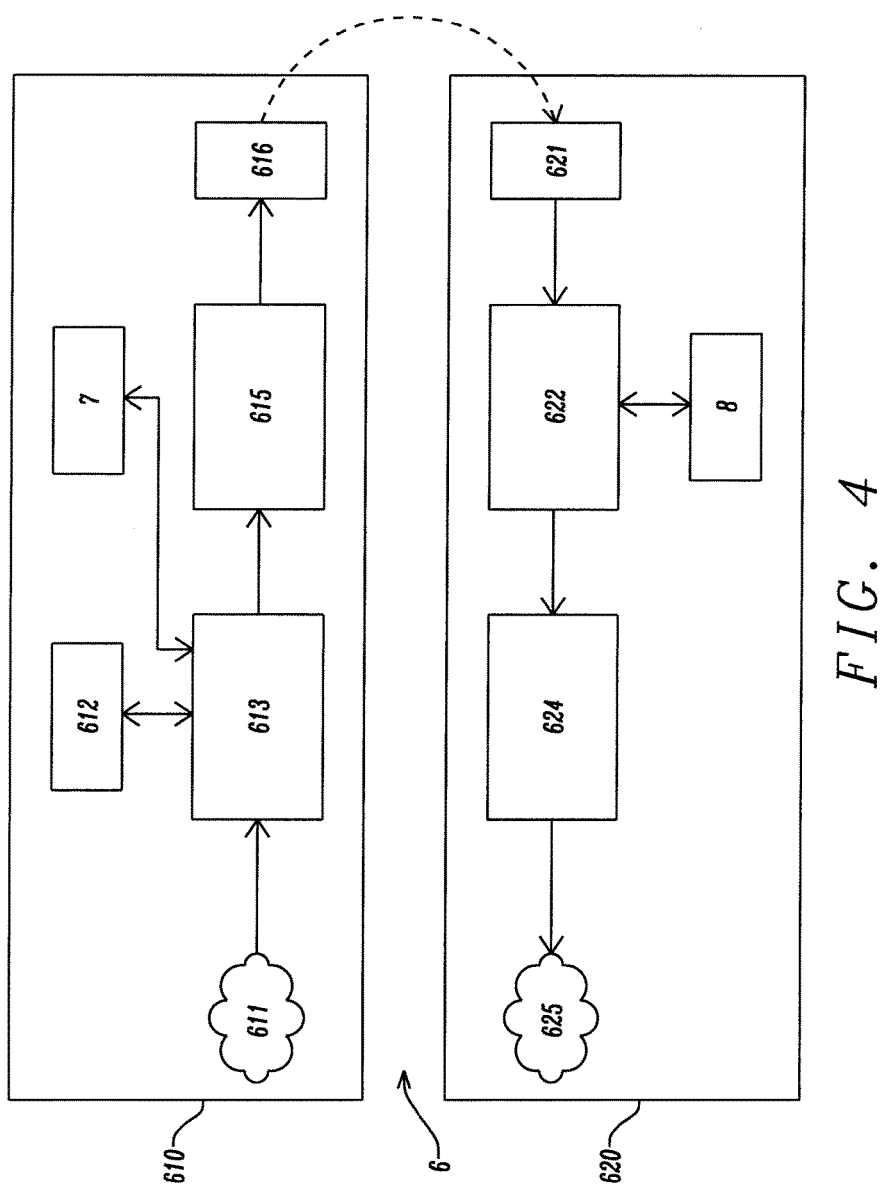
FIG. 4 schematically illustrates a messaging mechanism for a distributed power management system.

FIG. 4 illustrates the basic principles of a messaging mechanism 6 for the distributed power management system 200. Messaging mechanism 6 may be implemented in accordance with e.g. the system power management interface SPMI specification. A transmitter 610 may be implemented on the master PMIC 2 for transmitting messages to a receiver 620 which may be implemented on one or more slave PMICs 3, 4, 5. In addition, the transmitter 610 may be implemented on one or more of the slave PMICs 3, 4, 5 for transmitting messages to a receiver 620 implemented on the master PMIC 2. Changes in internal signals in one PMIC may be automatically communicated to one or more other PMICs, enabling all parts of the system to maintain synchronized. The messaging mechanism 6 may support communication of e.g. FSM states, internal status signals concerning e.g. the status of subsystems, synchronization requests, commands and events, coded into a unified message format.

The transmitter 610 may comprise a change detector 612, a message constructor 613, a message timer 7, a message transmit queue 615 and a transmitter communication interface 616. Depending on the implementation, the transmitter communication interface 616 may be part of the communication interface 27 of the master PMIC 2 or part of a communication interface 37, 47, 57 of a slave PMIC. The receiver 620, on the other hand, may comprise a receiver communication interface 621. Depending on the implementation, the receiver communication interface 621 may be part of a communication interface 37, 47, 57 of a slave PMIC or part of the communication interface 27 of the master PMIC 2. Further, the receiver 620 may comprise a message receive queue 622, a watchdog timer 8, and a message deconstructor 624.

The message constructor 613 may create, triggered by the change detector 612 or the message timer 7, a message based on source signals 611. Source signals may include e.g. FSM states, internal status signals concerning e.g. the status of subsystems, or other events such as e.g. error events.

The source signals 611 may make up the message payload. The change detector circuit 612 monitors the source signals 611, and, if any signals toggle from one clock to the next, a change is detected and a new message is generated and added to the message transmit queue 615. This applies for level sensitive source signals; events may be treated as rising-edge triggered. An additional mask option may allow changes to certain source signals or groups of source signals to be ignored. Optionally, a master override control input can force the message constructor 613 to generate a message independent of the trigger signals provided by the change detector 612 and the message timer 7. The output of the change detector 612 may be e.g. a flag or flags indicating that a new message should be created.

The message timer 7 may e.g. comprise a counter that is restarted whenever some or all source signals have been added to a message payload. If the counter completes i.e. if the counter counts down to 0 or counts up to a predefined value, a trigger signal may be generated to force creation of a new message at the message constructor 613 containing the source signals.

In the message constructor 613, the source signals are gathered together to form the message payload. The message may contain all of the current source signals, or as a variation, only include signals that have changed and new events. As a further variation, multiple messages may be constructed from different subsets of source signals if there are multiple destination PMICs, wherein each message requires a different payload. In this case, a more complex message timer 7 would be required to maintain different timeouts for different payloads.

A first protocol layer may be added around each message payload according to the requirements of the destination PMIC and the corresponding subsystems. Additional information might include memory map address, PMIC source, PMIC destination etc. This additional information may then be supplemented by a second protocol layer that adds communication interface specific framing, parity and other information as required by the transmitter interface 616.

Messages generated by the message constructor 613 are added to the message transmit queue 615. The message transmit queue 615 may be a first in-first out FIFO data buffer which forwards messages in the order they are received from the message constructor 613. In case a FIFO overflow is detected, an error event may be generated.

The message transmit queue 615 is emptied by the transmitter communication interface circuit 616. The chosen interface could be either a parallel or serial data type, as long as the sustained bandwidth is sufficient to carry the expected signaling traffic such that the message transmit queue 615 does not overflow and end to end latency does not adversely affect the power management system performance.

At the receiver 620, messages may be received by the receiver communication interface 621 and subsequently stored in the message receive queue 622, which may also be implemented as a FIFO buffer. Finally, the message deconstructor 624 decodes the message and outputs the destination signals 625.

The watchdog timer 8 may be e.g. a counter that may be restarted whenever a new message is received. Where a payload includes a full set of source signals, each received message may trigger a restart of the watchdog timer. A more complex mechanism is required if a message may contain only a subset of all source signals. If the counter of the watchdog timer 8 completes (count down to 0 or count up to a predefined value, depending on the implementation) then an error event may be signaled. The timeout value of the message timer 7 at the transmitter 610 should be smaller than the timeout value of the watchdog timer 8 in the one or more receivers 620.

Depending on the system requirements, the master PMIC 2 of the distributed power management system 200 may be required to receive messages from each of the slave PMIC 3, 4, 5 at regular time intervals. Using the above mechanism, a dedicated watchdog timer 8 would be required for each slave PMIC. As an alternative implementation, a single watchdog timer 8 could be used. The timer would always be allowed to complete, with a monitor checking that all required source signals 611 are received from each slave PMIC 3, 4, 5 during the timeout period.

Received messages may be treated as decaying over time, such that they must be refreshed at regular intervals. If a message is not refreshed within the required time, then this may be interpreted as an error event.

Using the described messaging mechanism 6, the master PMIC 2 may transmit, to the slave PMICs 3, 4, 5, synchronization information concerning at least one of an input signal of the master FSM 21, a state of the master FSM 21, a state transition of the master FSM 21, and an output signal generated by the master FSM 21. The transmission of the synchronization information may be either time-triggered using message timer 7 or triggered upon a change of one of the respective variables of the master FSM 21. The slave PMICs 3, 4, 5 may either directly control the power state of their subsystems using the received output signal generated by the master FSM 21 or synchronize, based on the received synchronization information, execution of the slave FSM 31, 41, 51 with the master FSM 21 and supply power to the slave subsystems 120, 130, 140, 150, 160, 170 based on a current state of the slave FSM 31, 41, 51.

Figure 5:
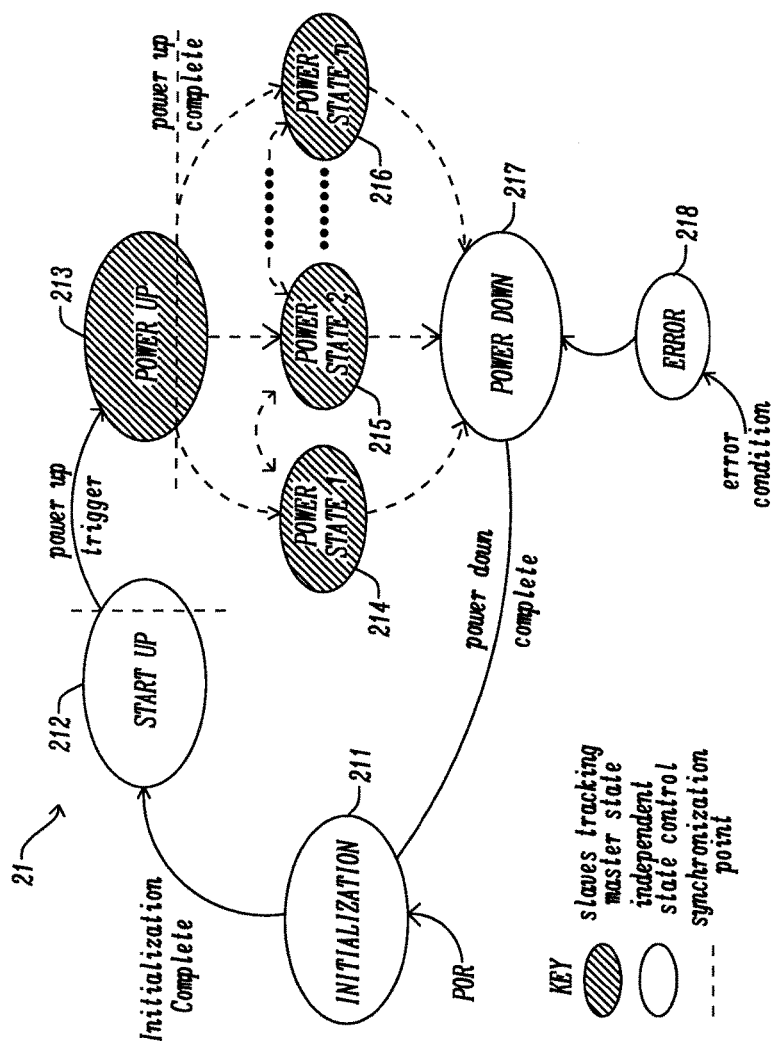
FIG. 5 shows a finite state machine for controlling a distributed power management system.

FIG. 5 shows an example for a finite state machine FSM 21 executed by the master PMIC 2 for controlling the distributed power management system 200. The same or a similar FSM 31, 41, 51 may also be executed by the slave PMICs 3, 4, 5. Upon occurrence of power-on reset POR signal, FSM 21 is set in an initialization state 211. The POR signal may be generated by a POR generator when power is applied to the electronic device. The POR signal is applied to all FSMs 21, 31, 41, 51 simultaneously. In the initialization state 211, the PMICs carry out initialization procedures independently of each other. During the initialization, PMIC configuration may take place and e.g. trim registers may be programmed using values read from a non-volatile memory. The initialization procedure may take a different amount of time for each PMIC.

After the initialization procedure has completed, the FSM 21 transitions to a start up state 212. At this point, the slave PMICs are not synchronized with the master PMIC and they do not track the state of the master FSM 21. As a consequence, transitions from the initialization state 211 to the start up state 212 are not synchronized between the different PMICs. Although initialization is complete, no power is supplied by the PMICs to the respective subsystems. Once the stable start up state 212 is reached, communication between the PMICs begins in order to establish synchronization. By communicating an initialization complete message to the master PMIC 2, each slave PMIC 3, 4, 5 indicates that it has reached the start up state 212 and is waiting. Once an initialization complete message has been received from each slave PMIC 3, 4, 5, the master PMIC 2 returns a synchronization instruction message to all slaves.

Upon transmission of the synchronization instruction message, the master FSM 21 transitions from the start up state 212 to a power up state 213. The slave FSMs 31, 41, 51 may transition from a start up state 212 to a power up state 213 upon reception of the synchronization instruction message. From this point, power supply to the subsystems is synchronized and power state control is provided solely by the master PMIC 2 by transmitting synchronization information concerning the state of the master FSM 21 to the slave PMICs 3, 4, 5. In the power up state 213, the power sequencers 22, 32, 42, 52 begin to supply power to the respective subsystems in a predefined order and at predefined intervals. At the same time, system status monitoring begins and e.g. voltages and temperatures are measured under the control of the ADC controllers 24, 34, 44, 54 and shared among the PMICs using the described messaging mechanism 6.

When the power up is completed, the distributed power management system 200 may transition between different power states 214, 215, 216 in which electrical power is supplied to all subsystems in a synchronized manner. The master FSM 21 may also force the distributed power management system 200 into an power down state 217 in which (after a predetermined power-down sequencing has taken place) no power is supplied to the subsystems.

Information from which the state of the master FSM 21 can be deduced may be transmitted, using the messaging mechanism 6, to all slave PMICs 3, 4, 5 on any change and optionally also at regular intervals to satisfy the watchdog requirements of each PMIC. Each slave PMIC 3, 4, 5 may return its status information on any change and optionally also at regular intervals to satisfy the watchdog requirements of the master PMIC 3. All information may be sent with every communicated message, regardless of whether the value has changed since the last message was sent.

The slave status information may include a "wait" request to tell the master PMIC 3 that the current status should not change. Such a request may be required if, for example during power sequencing, the duration of power sequence in each PMIC is different. In this case, it would be necessary for the master PMIC 3 to remain in the power sequencing state at least until all of the slave PMICs have completed their own sequence.

An error detected by one of the slave PMICS 3, 4, 5 (for example an over temperature condition) may result in the slave PMIC 3, 4, 5 sending an error status to the master PMIC 3. For instance, the slave PMIC may then disconnect from the master state tracking to continue autonomously, and may optionally enter an error state 218. If a tracking slave receives an updated "error" state, it may disconnect from the master state tracking and continue autonomously, too.

From the error state 218, a device may continue to the power down state 217 and sequence the power down of its connected subsystems. If all of the PMICs begin their power down sequence as soon as the error condition is received (or transmitted), then the system power sequence ordering and intervals may be preserved.

After a power down, a slave PMIC (or the master PMIC) may repeat the initialization step, then (assuming that the error condition has cleared) wait at the start-up state 212 and attempt to re-establish communication and synchronization with the master PMIC (or each slave PMIC).

Figure 6:
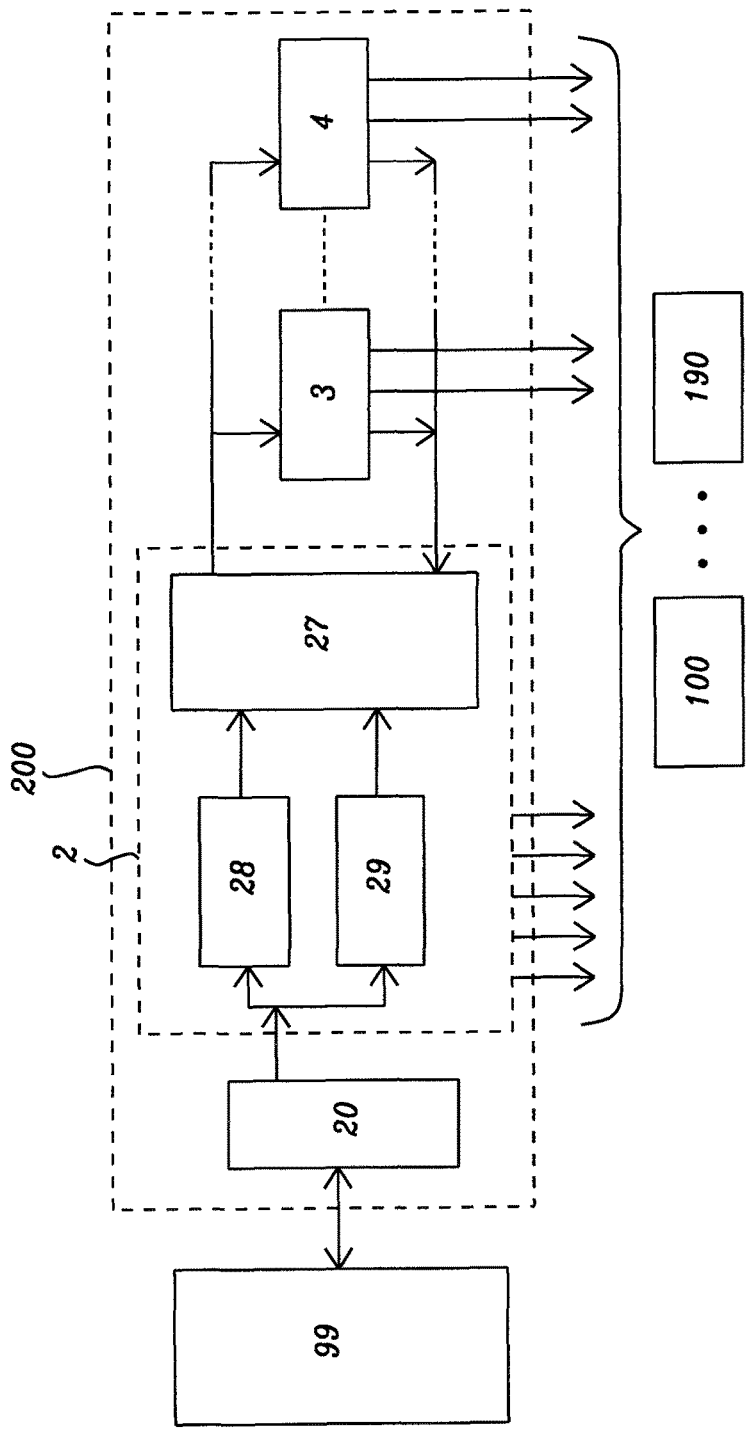
FIG. 6 illustrates a mechanism for memory map rerouting in a distributed power management system.

FIG. 6 illustrates a mechanism for memory map rerouting in a distributed power management system 200. A host device 99 may carry out communication only with the master PMIC 2. The master PMIC 2 must decide where the communication is targeted and reroute it to a slave PMIC 3, 4, 5 if necessary. Any response from the target slave PMIC 3, 4, 5 is received by the master PMIC 2 and returned to the host device 99. The rerouting steps may be transparent to the host device 99.

Besides the host interface 20 and the master-slave communication interface 27, the master PMIC 2 may comprise a slave lookup unit 28 and an address remapping unit 29. The slave lookup unit 28 may be configured to determine an identity of the target slave PMIC based on the communication received from the host device 99, and to forward the communication to the a target slave PMIC 3, 4, 5. In a memory mapped communications system, the intended target slave PMIC may be identified by the received address value of the host access. As one example, some upper address bits may be specifically allocated to a slave identification code. As an alternative, a preliminary address decoding stage could map address regions to slave PMIC IDs. In either case, these slave PMIC address regions could be configurable.

If the communication system does not use a memory mapped address in combination with a particular data format but is rather message based, then the contents of a message will need to be decoded or partially decoded to identify the target slave PMIC 3, 4, 5. A hybrid system comprising both memory mapped and message based communications may also be possible.

Having decoded the target slave PMIC 3, 4, 5, it may be necessary to further remap the address or message contents onto the target slave format, using e.g. an additional lookup stage or stages. To this end, the address remapping unit 29 may be configured to translate an address or a message content into a target slave format.

The master PMIC 2 must now communicate the remapped information to the target slave PMIC 3, 4, 5 using e.g. a separate communication channel. This communication channel may be internal to the distributed power management system 200, does not need to follow the same protocol as the host interface 20 and could be bus-based or point-to-point. The communications mechanism could be e.g. a standard parallel or serial communications interface (for example according to SPMI).

If the master PMIC 3 receives a reply from a slave PMIC 3, 4, 5, then this reply may be returned to the host device 99 via the host communication interface 20. If the master-to-slave interface 27 is significantly faster than the interface 20 to the host, then it may be possible to return data without adding any wait states at the host interface 20. If the reply path is not fast enough to meet the required host interface timing, then wait states or a NACK response and repeated read may be required.

Figure 7:
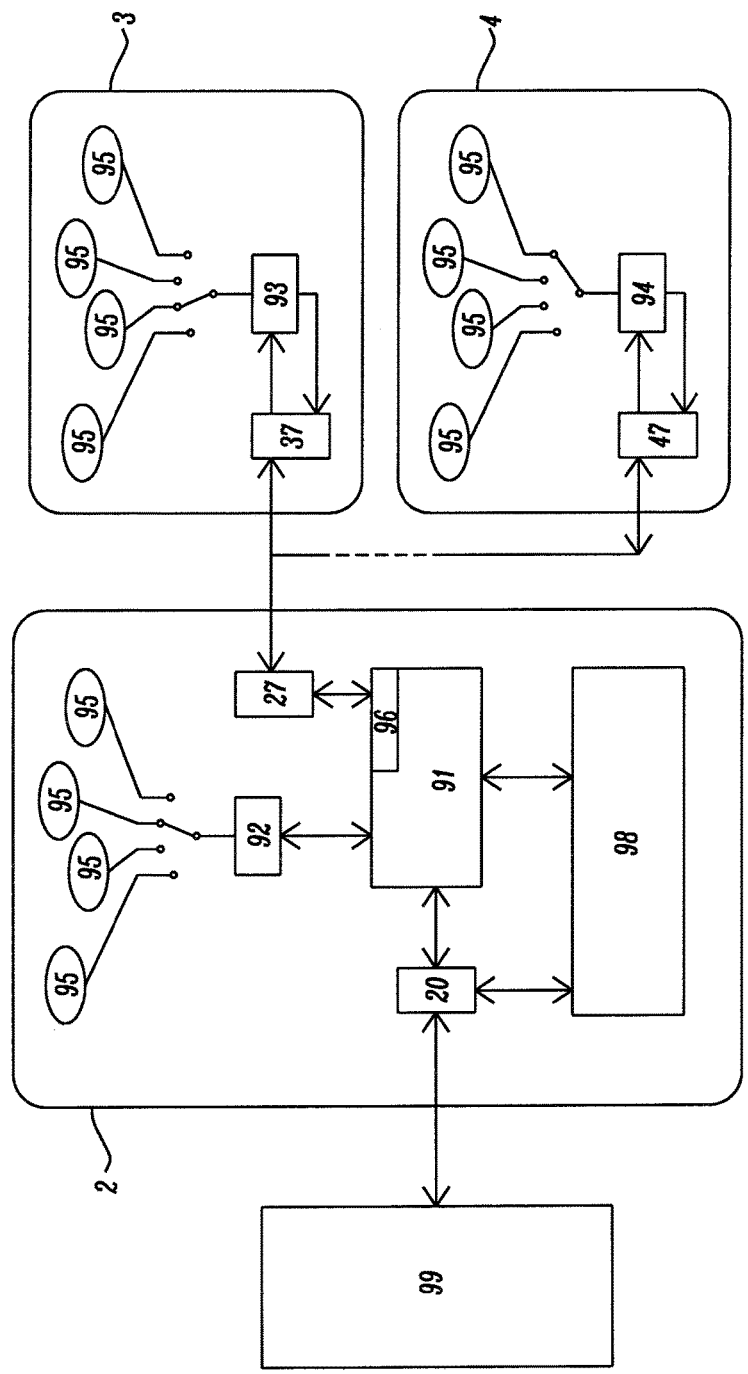
FIG. 7 illustrates a mechanism for ADC channel rerouting in a distributed power management system.

Turning now to FIG. 7, a mechanism for ADC channel rerouting in a distributed power management system 200 is illustrated. The illustrated exemplary master PMIC 2 comprises an ADC routing unit 91, which may e.g. comprise a channel look-up table LUT 96. The master PMIC 2 receives, from the host device 99, an analog-to-digital conversion ADC request comprising ADC channel information. The request may be received e.g. via the host interface 20. The ADC routing unit 91, which is coupled to the host interface 20, receives the request and determines the identity of a destination PMIC using e.g. the channel LUT 96. If the identity of the destination PMIC corresponds to the master PMIC's 2 own identity, the request is forwarded to the master PMIC's 2 local ADC unit 92, which in turn initiates an ADC measurement from a selected source 95. As already mentioned, sources 95 may include various voltages, currents or temperatures of the master subsystem. If the identity of the destination PMIC corresponds to an identity a slave PMIC 3, 4, 5, the request is forwarded to the respective slave PMIC 3, 4, 5 via master-slave communication interface 27 of the master PMIC 2 and the respective slave-master communication interface 37, 47, 57 of the respective slave PMIC 3, 4, 5. Upon reception of the request, a remote ADC unit 93, 94 initiates an ADC measurement from a selected source 95.

Moreover, the master PMIC 2 may receive, from a slave PMIC 3, 4, 5, ADC measurement data measured by a remote ADC unit 93, 94. The measurement data is forwarded to an ADC post-processer 98 within the master PMIC 3, which determines an ADC result by performing post-processing based on the received ADC measurement data. The ADC result may then be forwarded to the host device 99 via the host interface 20.

Optionally, the ADC routing unit 91 may generate, according to configuration settings, automated ADC conversion requests to certain ADC channels at predetermined intervals. As another option, the host interface 20 between the host device 99 and the master PMIC 2 may allow the host to directly make ADC conversion requests to any channel in the system.

In the distributed power management system 200, the described communication infrastructure between master PMIC 2 and slave PMICs 3, 4, 5 may additionally be used to access and control other parts of the slave PMICs 3, 4, 5, other than the power management state and power sequencing. These other parts might include registers and memory, peripherals and IO. The mechanism could provide indirect remote access to the slave PMICs 3, 4, 5 for a host device 99, creating the appearance to the host of a single power management integrated circuit.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A distributed power management system comprising a master power management integrated circuit (PMIC) configured to supply power to a subsystem of an electronic device based on a present state of a master finite state machine (FSM) executed by the master PMIC; and
   a slave power management integrated circuit (PMIC) configured to execute a slave finite state machine (FSM), the slave FSM comprising anchor states where the slave FSM is synchronized with the master FSM;
   wherein the master PMIC is configured to transmit, to the slave PMIC, synchronization information indicative of at least one of an input signal of the master FSM, a state of the master FSM, a state transition of the master FSM, and an output signal generated by the master FSM,
   wherein the slave PMIC is configured to supply power to another subsystem of the electronic device based on the present state of the master FSM and if the present state of the slave FSM is an anchor state,
   and wherein the slave PMIC is configured, in an initialization phase, to supply power to the another subsystem of the electronic device independent of the present state of the master FSM and upon reaching an anchor state, to perform synchronization procedures with the master PMIC.

2. The distributed power management system according to claim 1, wherein the slave PMIC is configured to synchronize, based on the received synchronization information, execution of the slave FSM with the master FSM and to supply power to the another subsystem of the electronic device based on a present state of the slave FSM.

3. The distributed power management system according to claim 1, wherein the master PMIC is configured to transmit the synchronization information responsive to a change of the input signal, the state or the output signal of the master FSM.

4. The distributed power management system according to claim 1, further comprising a timer, wherein the master PMIC is configured to transmit the synchronization information when the timer expires.

5. The distributed power management system according to claim 1, wherein the slave PMIC is configured to transmit, to the master PMIC, synchronization information concerning a present state of the slave FSM or status information concerning a status of the another subsystem powered by the slave PMIC.

6. The distributed power management system according to claim 1, wherein the master PMIC is configured to transmit, to the slave PMIC, status information concerning a status of the subsystem powered by the master PMIC.

7. The distributed power management system according to claim 1, further comprising a second slave PMIC configured to supply power to a second subsystem of the electronic device, wherein the second slave PMIC or the master PMIC is configured to transmit, to the slave PMIC, status information concerning a status of the second subsystem.

8. The distributed power management system according to claim 1, wherein the slave PMIC is configured to transmit, to the master PMIC, an initialization complete message indicating that the slave PMIC has finished an initialization procedure, and the master PMIC is configured to transmit, responsive to receiving the initialization complete message, a synchronization instruction message to the slave PMIC instructing the slave PMIC to supply power to the another subsystem of the electronic device based on the present state of the master FSM.

9. The distributed power management system according to claim 1, wherein the master PMIC is configured to receive, from a host device, a communication directed to a target slave PMIC, to determine an identity of the target slave PMIC based on the communication, and to forward the communication to the target slave PMIC.

10. The distributed power management system according to claim 9, wherein the master PMIC is configured to translate an address or a message content into a target slave format.

11. The distributed power management system according to claim 1, wherein the master PMIC is configured to receive, from a host device, an analog-to-digital conversion ADC request comprising ADC channel information, to determine an identity of a destination slave PMIC based on the ADC channel information, and to forward the ADC request to the destination slave PMIC.

12. The distributed power management system according to claim 1, wherein the master PMIC is configured to receive, from a slave PMIC, ADC measurement data, to determine an ADC result by performing post-processing based on the received ADC measurement data, and to forward the ADC result to the host device.

13. The distributed power management system according to claim 1, further comprising a watchdog timer which is reset when synchronization information or status information is received by the master PMIC and the distributed power management system is configured to generate an error event upon expiration of the watchdog timer.

14. The distributed power management system according to claim 13, wherein all PMICs are configured to shut-down in case an error event occurs.

15. A distributed power management method carried out by a master power management integrated circuit (PMIC) and a slave PMIC, comprising:
    executing, by the master PMIC, a master finite state machine (FSM);
    supplying, by the master PMIC, power to a subsystem of an electronic device based on a present state of the master FSM;
    executing by the slave PMIC, a slave finite state machine (FSM), the slave FSM comprising anchor states where the slave FSM is synchronized with the master FSM;
    transmitting, by the master PMIC, synchronization information indicative of at least one of an input signal of the master FSM, a state of the master FSM, a state transition of the master FSM, and an output signal generated by the master FSM to the slave PMIC;
    in an initialization phase, supplying power to the another subsystem of the electronic device by the slave PMIC independent of the present state of the master FSM;
    upon reaching an anchor state, performing synchronization procedures with the master PMIC; and
    supplying, by the slave PMIC, power to another subsystem of the electronic device based on the present state of the master FSM and if the present state of the slave FSM is an anchor state.

16. The distributed power management method according to claim 15, further comprising:
    executing, by the slave PMIC, a slave FSM;

synchronizing, by the slave PMIC, based on the received synchronization information, execution of the slave FSM with the master FSM; and supplying power to the another subsystem of the electronic device based on a present state of the slave FSM.

17. The distributed power management method according to claim 15, further comprising the step of:

transmitting by the master PMIC the synchronization information responsive to a change of the input signal, the state or the output signal of the master FSM.

18. The distributed power management method according to claim 15, further comprising the step of:

transmitting by the master PMIC with a timer, the synchronization information when the timer expires.

19. The distributed power management method according to claim 15, further comprising the step of:

transmitting by the slave PMIC to the master PMIC, synchronization information concerning a present state of the slave FSM or status information concerning a status of the another subsystem powered by the slave PMIC.

20. The distributed power management method according to claim 15, further comprising the step of:

transmitting by the master PMIC to the slave PMIC, status information concerning a status of the subsystem powered by the master PMIC.

21. The distributed power management method according to claim 15, further comprising the step of:

supplying by a second slave PMIC, power to a second subsystem of the electronic device, wherein the second slave PMIC or the master PMIC transmits, to the slave PMIC, status information concerning a status of the second subsystem.

22. The distributed power management method according to claim 15, further comprising the steps of:

transmitting by the slave PMIC to the master PMIC, an initialization complete message indicating that the slave PMIC has finished an initialization procedure, and transmitting by the master PMIC, responsive to receiving the initialization complete message, a synchronization instruction message to the slave PMIC instructing the slave PMIC to supply power to the another subsystem of the electronic device based on the present state of the master FSM.

23. The distributed power management method according to claim 15, further comprising the step of:

receiving by the master PMIC from a host device, a communication directed to a target slave PMIC, to determine an identity of the target slave PMIC based on the communication, and to forward the communication to the target slave PMIC.

24. The distributed power management method according to claim 23, further comprising the step of:

tranlating by the master PMIC, an address or a message content into a target slave format.

25. The distributed power management method according to claim 15, further comprising the step of:

receiving by the master PMIC from a host device, an analog-to-digital conversion ADC request comprising ADC channel information, to determine an identity of a destination slave PMIC based on the ADC channel information, and to forward the ADC request to the destination slave PMIC.

26. The distributed power management method according to claim 15, further comprising the step of:

receiving by the master PMIC from a slave PMIC, ADC measurement data, to determine an ADC result by performing post-processing based on the received ADC measurement data, and to forward the ADC result to the host device.

27. The distributed power management method according to claim 15, further comprising the step of:

resetting a watchdog timer when synchronization information or status information is received by the master PMIC and the distributed power management system generates an error event upon expiration of the watchdog timer.

28. The distributed power management method according to claim 27, further comprising the step of:

shutting down all PMICs in case an error event occurs.

* * * * *